(12) United States Patent
Oki

(10) Patent No.: US 7,835,046 B2
(45) Date of Patent: Nov. 16, 2010

(54) DATA PROCESSING APPARATUS, DATA PROCESSING METHOD, COMPUTER PROGRAM, AND STORAGE MEDIUM

(75) Inventor: Joji Oki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 11/266,780

(22) Filed: Nov. 4, 2005

(65) Prior Publication Data

US 2006/0098230 A1    May 11, 2006

(30) Foreign Application Priority Data

Nov. 10, 2004    (JP) .............................. 2004-326461

(51) Int. Cl.
*H04N 1/46* (2006.01)
*H04N 1/60* (2006.01)
*H04N 1/40* (2006.01)
*G06K 15/00* (2006.01)
*G06F 15/00* (2006.01)

(52) U.S. Cl. .................... 358/534; 358/1.9; 358/2.1; 358/3.06; 358/530

(58) Field of Classification Search ................ 358/1.1, 358/1.2, 1.9, 2.1, 2.03, 3.06, 3.21, 3.24
See application file for complete search history.

(56) References Cited

U.S. PATENT DOCUMENTS

| 5,596,352 | A | * | 1/1997 | Bliss et al. ................ 347/15 |
| 5,963,935 | A | * | 10/1999 | Ozbutun et al. ............. 707/3 |
| 6,078,399 | A | * | 6/2000 | Kadota .................... 358/1.13 |
| 6,552,819 | B2 | * | 4/2003 | Osawa et al. .............. 358/1.17 |
| 7,092,120 | B2 | * | 8/2006 | Muramoto ................. 358/1.9 |
| 2004/0145759 | A1 | * | 7/2004 | Nishida et al. ............. 358/1.9 |

* cited by examiner

*Primary Examiner*—Twyler L Haskins
*Assistant Examiner*—Ming Hon
(74) *Attorney, Agent, or Firm*—Cowan, Liebowitz & Latman, P.C.

(57) ABSTRACT

A data processing apparatus includes a first processing unit for executing color conversion processing and halftoning processing of data before composition processing of data, a second processing unit for executing color conversion processing and halftoning processing of data after composition processing of data, and a selector for selecting one of the first and second processing units.

8 Claims, 11 Drawing Sheets

DATA PROCESSING APPARATUS, DATA PROCESSING METHOD, COMPUTER PROGRAM, AND STORAGE MEDIUM

FIELD OF THE INVENTION

The present invention relates to a data processing apparatus, data processing method, computer program, and storage medium.

BACKGROUND OF THE INVENTION

When a print control apparatus executes composition processing, a display list is generated by sorting a plurality of pieces of vector information that describe contour data of graphics objects that form a page on the basis of vector start coordinates. Also, a display list is generated using fill information of graphics objects that form a page as multilevel data corresponding to the vector information. Furthermore, upon transforming the display list into raster data, raster data is generated in the order of sort directions on the basis of the sorted vector information in the display list. Furthermore, upon transforming the display list into raster data, when composition processing between graphics objects is included, it is executed using only fill information that influences final output pixels. In such a print control apparatus, the composition processing is always done using multilevel data. Moreover, color space conversion and halftoning processing are executed after composition. This is because the Raster Operation (to be abbreviated as ROP hereinafter) of Windows® is premised on composition processing for multilevel data.

Note that the ROP processing is logical operation processing to be executed when two or more objects (raster images) overlap each other. By executing the ROP processing, not only two or more objects are overwritten with depth ordering, but also effects of watermarking, inversion, and the like can be given. ROP2 of Windows® executes a logical operation of two objects, i.e., a source (a new image to be written) and destination (original image; an already written image). These instructions execute logical operation processing such as AND, OR, NOT, XOR, and the like for respective objects, and write the result in the destination. With the ROP2, 16 different types of logical operation processing are available depending on the combinations of the states of respective drawing objects and output results.

On the other hand, raster data is generated from a display list before the display list for one page is generated due to an insufficient memory used to store a display list, and a display list using the generated raster data as a background of a page is often generated.

In such a print apparatus, for example, when the fill information of the display list stored as the background is multilevel data, the display list size becomes large, and the problem of an insufficient memory cannot be sufficiently solved. If a sufficiently small data size is to be attained by multilevel data compression (e.g., JPEG or the like) so as to reduce the display list size, image quality deteriorates consequently, and the quality drop of a printed image becomes conspicuous.

When data undergoes halftoning processing to reduce the data size of the background, multilevel data and halftone data must be composited upon processing the ROP of Windows® as composition processing. Since the ROP of Windows® is premised on multilevel processing, troubles upon composition must be minimized.

It is, therefore, an object of the present invention to allow raster generation with a small memory size and high image quality and to minimize troubles upon composition even when a display list is generated as a background due to an insufficient memory used to store the display list.

SUMMARY OF THE INVENTION

In order to solve the aforementioned problems individually or simultaneously, according to the present invention, a data processing apparatus comprises a first processing unit for executing color conversion processing and halftoning processing of data before composition processing of data, a second processing unit for executing color conversion processing and halftoning processing of data after composition processing of data, and a selector for selecting one of the first and second processing units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

This embodiment will explain a case where the present invention is applied to a laser beam printer (to be abbreviated as an LBP hereinafter). An example of the structure of the LBP according to this embodiment will be described below with reference to FIGS. 1 and 2.

Figure 1:
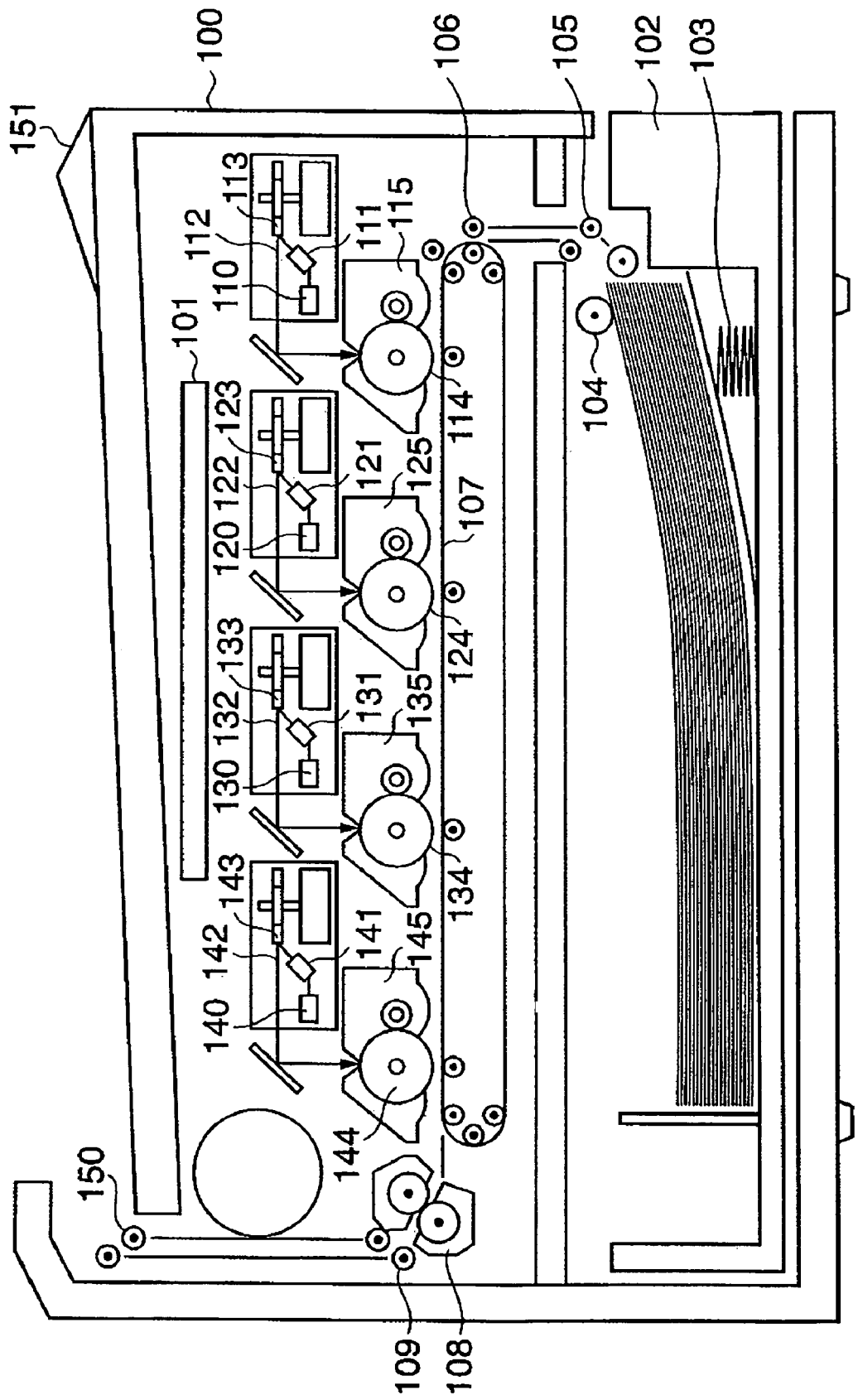
FIG. 1 is a sectional view showing an example of the internal structure of an LBP according to an embodiment of the present invention.
Figure 2:
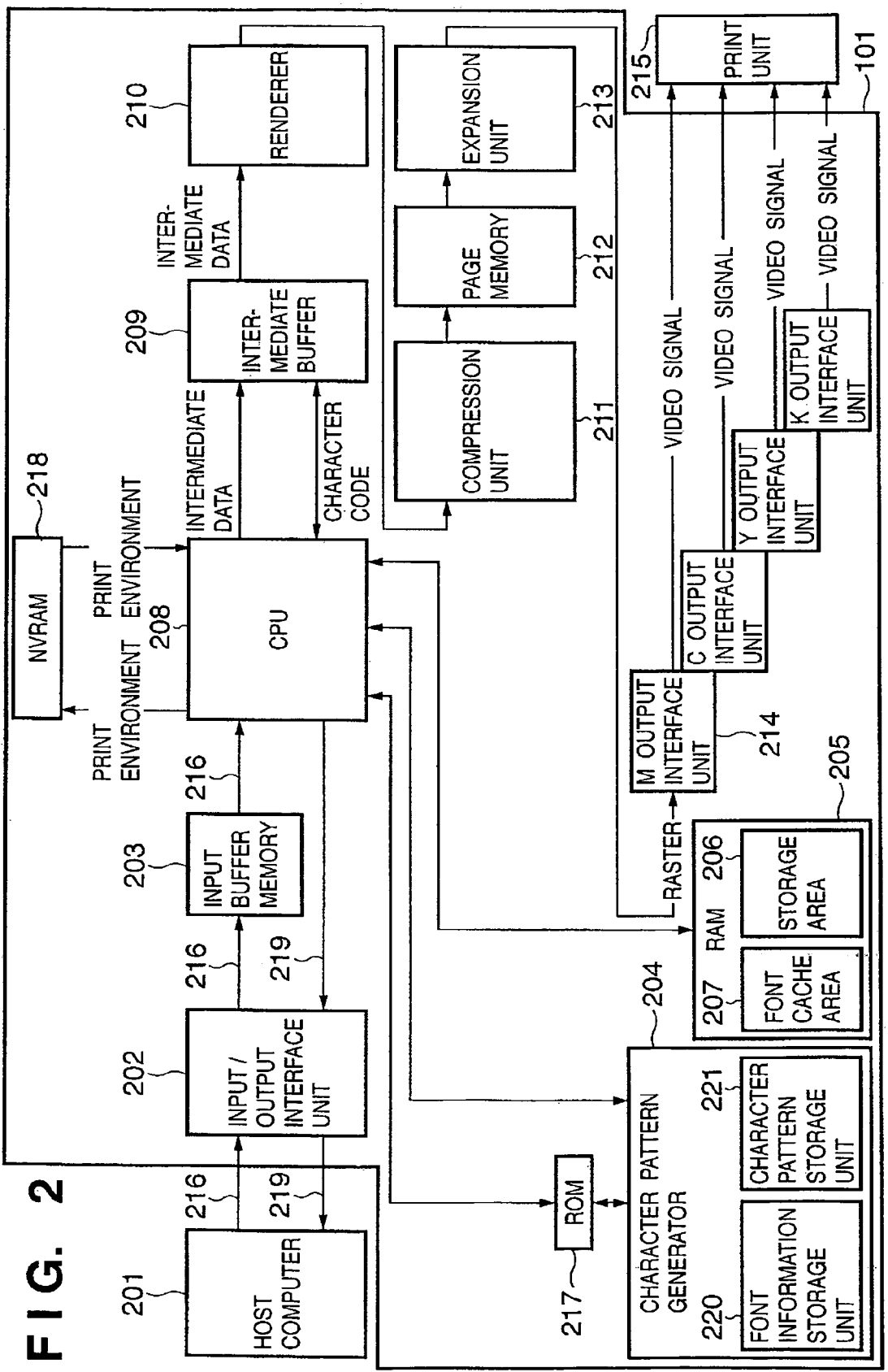
FIG. 2 is a schematic block diagram showing the arrangement of a control system 101 of an LBP 100 according to the embodiment of the present invention.

FIG. 1 is a sectional view showing an example of the internal structure of the LBP according to this embodiment. FIG. 2 is a block diagram for explaining an example of the control arrangement of the LBP main body shown in FIG. 1.

Referring to FIG. 1, reference numeral 100 denotes an LBP main body, which generates character pattern data, graphics data, image data, and the like in accordance with a character print instruction, various graphics drawing instructions, image drawing instruction, color designating instruction, and the like, which are supplied from an external connected host computer (201 in FIG. 2), and forms an image on a print sheet as a print medium. Reference numeral 151 denotes a control panel on which switches for operations, LED indicators and LCD display which indicate printer status, and the like are arranged. Reference numeral 101 denotes a printer control unit which controls the overall LBP 100 and interprets a character print instruction and the like supplied from the host computer.

Since the LBP 100 in this embodiment converts RGB color information into color components M (magenta), C (cyan), Y (yellow), and K (black), and parallelly performs image formation and development of these color components, it respectively comprises M, C, Y, and K image formation/development mechanisms. The printer control unit 101 generates M, C, Y, and K print images, converts them into video signals, and outputs the video signals to M, C, Y, and K laser drivers 110, 120, 130, and 140.

The M (magenta) laser driver 110 is a circuit for driving a semiconductor laser 111, and turns on/off a laser beam 112 emitted from the semiconductor laser 111 in accordance with the input video signal. The laser beam 112 is deflected by a rotating polygon mirror 113 in the right-and-left directions to scan the surface of an electrostatic drum 114. As a result, an electrostatic latent image of character and graphics patterns is formed on the electrostatic drum 114. This latent image is developed by a developing unit (toner cartridge) 115 around the electrostatic drum 114, and is then transferred onto a print sheet.

As for C (cyan), Y (yellow), and K (black), the LBP 100 comprises similar image formation/development mechanisms as that for M (magenta). That is, components 120, 121, 122, 123, 124, and 125 form a C (cyan) image formation/development mechanism, components 130, 131, 132, 133, 134, and 135 form a Y (yellow) image formation/development mechanism, and components 140, 141, 142, 143, 144, and 145 form a K (black) image formation/development mechanism. The functions of individual components are the same as those of the M (magenta) image formation/development mechanism, and a description thereof will be omitted.

As a print sheet, a cut sheet is used. Cut print sheets are stored in a paper feed tray 102 attached to the LBP 100, and are held at a given level by a spring 103. Each cut print sheet is fed into the apparatus by a paper feed roller 104 and conveying rollers 105 and 106, and passes the M, C, Y, and K image formation/development mechanisms while being carried on a sheet conveying belt 107.

M, C, Y, and K toner (powder ink) images transferred onto a print sheet are fixed by heat and pressure of a fixing unit 108, and the print sheet is output onto an upper portion of the LBP main body 100 by conveying rollers 109 and 150.

FIG. 2 is a schematic block diagram showing the arrangement of the control system (printer control unit) 101 of the LBP 100 shown in FIG. 1. The control system of the LBP receives data 216 including character, graphics, and image drawing instructions, color information, and the like sent from a host computer 201 as a generation source of print information, and prints document information or the like for respective pages.

Reference numeral 202 denotes an input/output interface unit which exchanges various kinds of information with the host computer 201; and 203, an input buffer memory which temporarily stores various kinds of information input via the input/output interface unit 202. Reference numeral 204 denotes a character pattern generator which comprises a font information storage unit 220 that stores attributes such as the widths, heights, and the like of characters and addresses of actual character patterns, a character pattern storage unit 221 that stores character patterns themselves, and a read control program of the character patterns.

The read control program is included in a ROM 217, and has a code convert function of calculating the address of a character pattern corresponding to an input character code when the code is input. Reference numeral 205 denotes a RAM which includes a font cache area 207 that stores a character pattern output from the character pattern generator 204, and a storage area 206 that stores external character fonts and form information sent from the host computer 201, current print environment, and the like.

In this way, since pattern information developed once to a character pattern is stored in the font cache area 207 as a font cache, an identical character need not be decoded and developed into a pattern upon printing the identical character, thus speeding up development to character patterns.

Reference numeral 208 denotes a CPU which controls the entire control system of the printer. The CPU 208 controls the overall apparatus on the basis of its control program stored in the ROM 217. Reference numeral 209 denotes an intermediate buffer which stores an internal data group generated based on the input data 216. Upon completion of reception of data for one page, they are converted into more simple intermediate data, which are stored in the intermediate buffer. After that, the intermediate data are rendered by a renderer 210 for several lines, and are output to a compression unit 211 as print image data.

Note that the renderer 210 receives R, G, and B or C, M, Y, and K 8-bit multilevel data as intermediate data, and outputs C, M, Y, and K 1-bit halftone data as output data. The compression unit 211 compresses the halftone data for several scan lines, and stores the compressed data in a page memory 212. After rendering of the contents of the intermediate buffer for one page is completed and the rendered data are stored in the page memory 212, an expansion unit 213 reads out and expands the data for several lines.

The expanded image data are converted into video signals by output interface units 214, and the video signals are output to a print unit 215. Reference numeral 215 denotes a print mechanism of a page printer for printing image information on the basis of the video signals from the output interface units 214.

As has been described above using FIG. 1, since the LBP 100 of this embodiment parallelly performs M, C, Y, and K image formation/development processes, the output interface units 214 include four, i.e., M, C, Y, and K output interface units. These output interface units independently acquire dot data from the expansion unit 213, convert them into video signals, and output the video signals to the laser drivers 110, 120, 130, and 140 of respective planes.

Reference numeral 218 denotes a nonvolatile memory which comprises a general EEPROM or the like, and will be referred to as an NVRAM (Non Volatile RAM) hereinafter. The NVRAM 218 stores panel setting values and the like designated on the control panel 151. Reference numeral 219 denotes data to be transmitted from the LBP 100 to the host computer 201. Note that the ROM 217 includes an interpretation program of data input from the host computer 201, a generation program of intermediate data, a control program of the control system 101, and the like.

In this embodiment, the color laser printer has been exemplified as the printing apparatus. However, the present invention may be applied to other color printers such as a color ink-jet printer, color thermal transfer printer, and the like.

Note that the renderer 210 generates C, M, Y, and K 1-bit halftone data. However, the number of bits per pixel of each color may assume any other values that have undergone the halftoning processing. In this case, the compression unit 211, page memory 212, and expansion unit 213 need only support the color space and the number of bits per pixel generated by the renderer 210.

The renderer 210 receives R, G, and B or C, M, Y, and K 8-bit multilevel data as intermediate data. However, the number of bits per pixel of each color may assume any other values before the halftoning processing.

Figure 3:
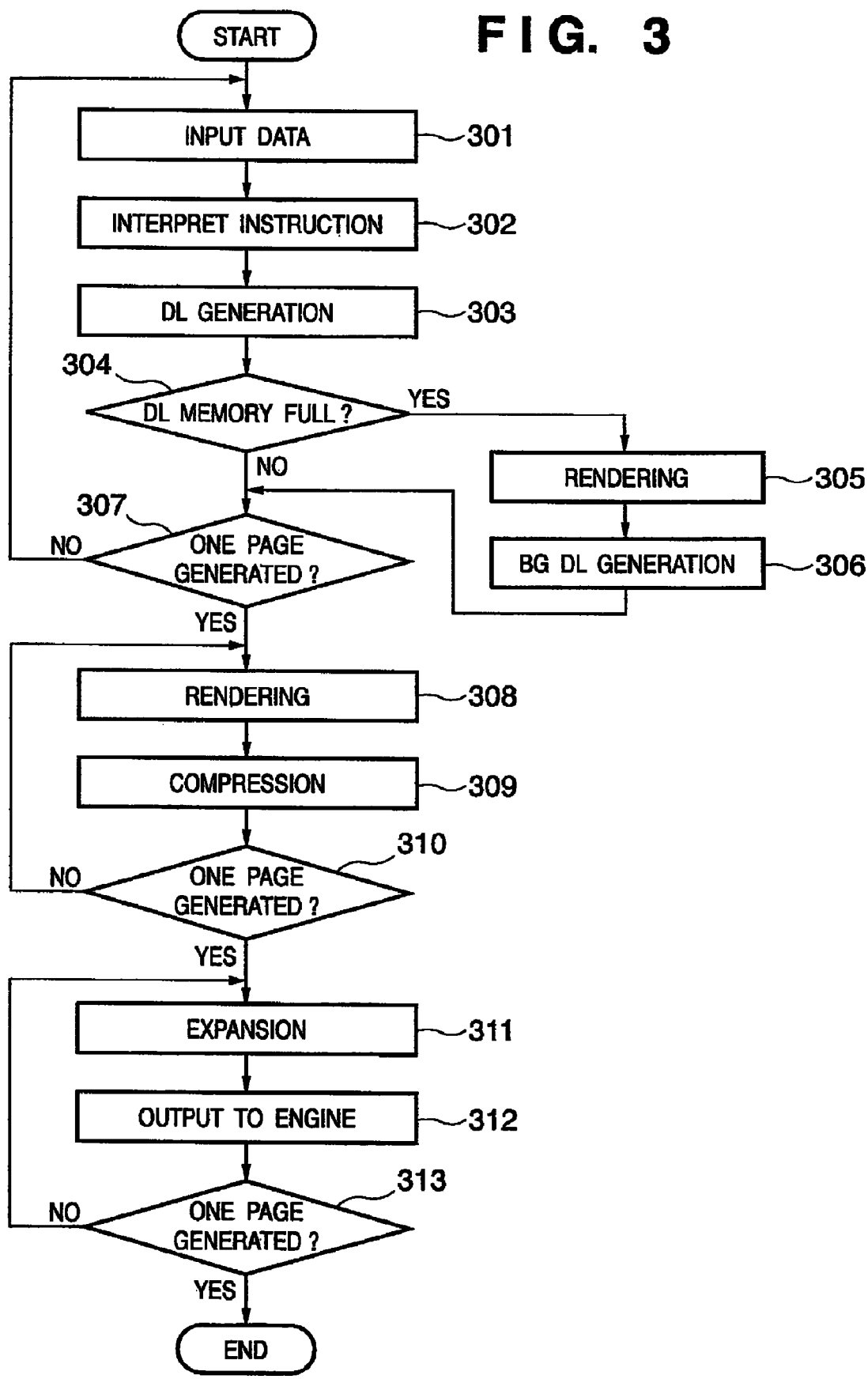
FIG. 3 is a flowchart showing an example of drawing processing according to the embodiment of the present invention.

FIG. 3 is a flowchart of drawing processing according to this embodiment. In step 301, page description data is input to the input buffer 203. In step 302, the CPU 208 interprets drawing instructions in the data. In step 303, the interpreted data are converted into intermediate codes (display list: DL), and the intermediate codes are stored in the intermediate buffer 209.

It is detected in step 304 if the intermediate buffer 209 is full of data. If the intermediate buffer 209 is full of data, the flow advances to step 305; otherwise, the flow advances to step 307.

In step 305, the renderer 210 renders the intermediate codes. In this rendering processing, when objects on the intermediate buffer are not composited to background bitmap data, R, G, and B multilevel data are color-converted into C, M, Y, and K multilevel data after the objects on the intermediate buffer are composited, and the color-converted C, M, Y, and K multilevel data undergo halftoning processing to obtain C, M, Y, and K binary data. On the other hand, when objects on the intermediate buffer are composited to background bitmap data, R, G, and B multilevel data of the objects on the intermediate buffer are color-converted into C, M, Y, and K multilevel data, C, M, and Y binary data obtained by converting the color-converted C, M, Y, and K multilevel data are composited to C, M, and Y binary data obtained by expanding the background bitmap data to C, M, Y, and K binary data and converting the C, M, Y, and K binary data. The composited C, M, and Y binary data are converted into C, M, Y, and K binary data.

Furthermore, these binary data are compressed by the compression unit 211. The compressed data are temporarily stored in the page memory 212. After the rendered intermediate codes are deleted from the intermediate buffer 209, data are copied from the page memory 212 to the intermediate buffer 209.

In step 306, the compressed data are converted into a display list by storing a pointer to this bitmap image data in Fill Table=0 as a background (BG) of a page.

It is checked in step 307 if display list conversion of the drawing commands for one page is complete. If it is determined that display list conversion is complete, the flow advances to step 308; otherwise, the flow returns to step 301 to repeat the aforementioned processes.

In step 308, the renderer 210 renders all display list data for one page. In this rendering processing, when objects on the intermediate buffer are not composited to background bitmap data, R, G, and B multilevel data are then color-converted into C, M, Y, and K multilevel data after the objects on the intermediate buffer are composited, and the color-converted C, M, Y, and K multilevel data undergo halftoning processing to obtain C, M, Y, and K binary data. On the other hand, when objects on the intermediate buffer are composited to background bitmap data, R, G, and B multilevel data of the objects on the intermediate buffer are color-converted into C, M, Y, and K multilevel data, C, M, and Y binary data obtained by converting the color-converted C, M, Y, and K multilevel data are composited to C, M, and Y binary data obtained by expanding the background bitmap data to C, M, Y, and K binary data and converting the C, M, Y, and K binary data. The composited C, M, and Y binary data are converted into C, M, Y, and K binary data. Furthermore, in step 309 the compression unit 211 compresses the rendered data and stores them in the page memory 212. It is checked in step 310 if all data for one page have been compressed. If it is determined that all data for one page have been compressed, the flow advances to step 311; otherwise, the flow returns to step 308 to continue processing.

In step 311, the expansion unit 213 expands the compressed data in the page memory 212. As has been described above using FIG. 1, since the LBP 100 of this embodiment parallelly executes M, C, Y, and K image formation/development processes, M, C, Y, and K data are also parallelly expanded. In step 312, the expanded data are sent from the interface units 214 to the print unit 215.

It is checked in step 313 if all data for one page are output to an engine. If it is determined that all data for one page are output to the engine, the flow advances to step 314 to end the processing for one page. On the other hand, if it is determined that all data for one page are not output to the engine, the flow returns to step 311 to continue processing.

Figure 4:
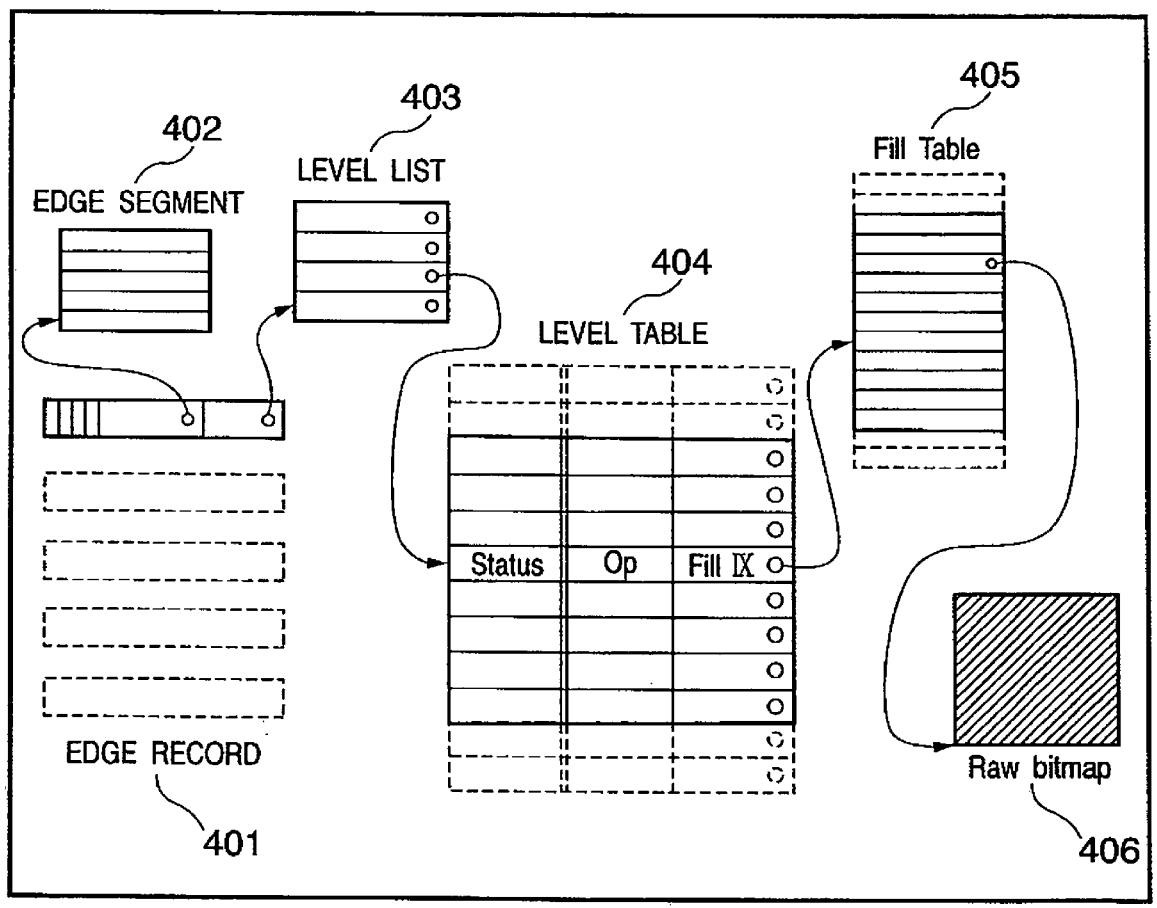
FIG. 4 shows an example of the structure of a display list according to the embodiment of the present invention.

FIG. 4 shows an example of the structure of a display list generated by DL generation in step 303. Each of edge records 401 comprises a pointer to an edge segment 402 and that to a level list 403, and respective records are sorted in the order of start Y-coordinates. Also, records with the same start Y-coordinate are sorted in the order of start X-coordinates. Each edge segment 402 indicates the contents of an edge, and has one-to-one correspondence with the edge record 401. The level list 403 is a list for managing the drawing order of graphics objects, and is arranged in turn from rendering order 0. Note that the level can be alternatively expressed by another word "layer" That is, if the background has level 0, an object drawn on the background has level 1, and an object drawn to be superposed on the object of level 1 corresponds to level 2.

A level table 404 that registers level information comprises a drawing logic (ROP) of a graphics object as Op (Operation) and a pointer to a Fill table (fill information table) 405 as Fill Index. Also, the level table 404 comprises, as Status, a flag indicating whether or not the ROP of the current level refers to a lower layer. The Fill table 405 comprises a parameter of fill information (color information) of a graphics object. Also, when a graphic object indicates an image, the Fill table 405 comprises a pointer to a Raw bitmap 406.

The types and parameters of fill information are, for example, as follows.

(1) Unicolor: R, G, and B values (2) Gradation: R, G, and B values, and X- and Y-coordinates of two or three points as base points of gradation (3) Tile: a matrix from device coordinates to image coordinates, and a pointer to an image (4) Image: a matrix from device coordinates to image coordinates, and a pointer to an image When a graphics object is an image, the Raw bitmap 406 comprises its entity. Note that the image may be compressed.

Figure 5:
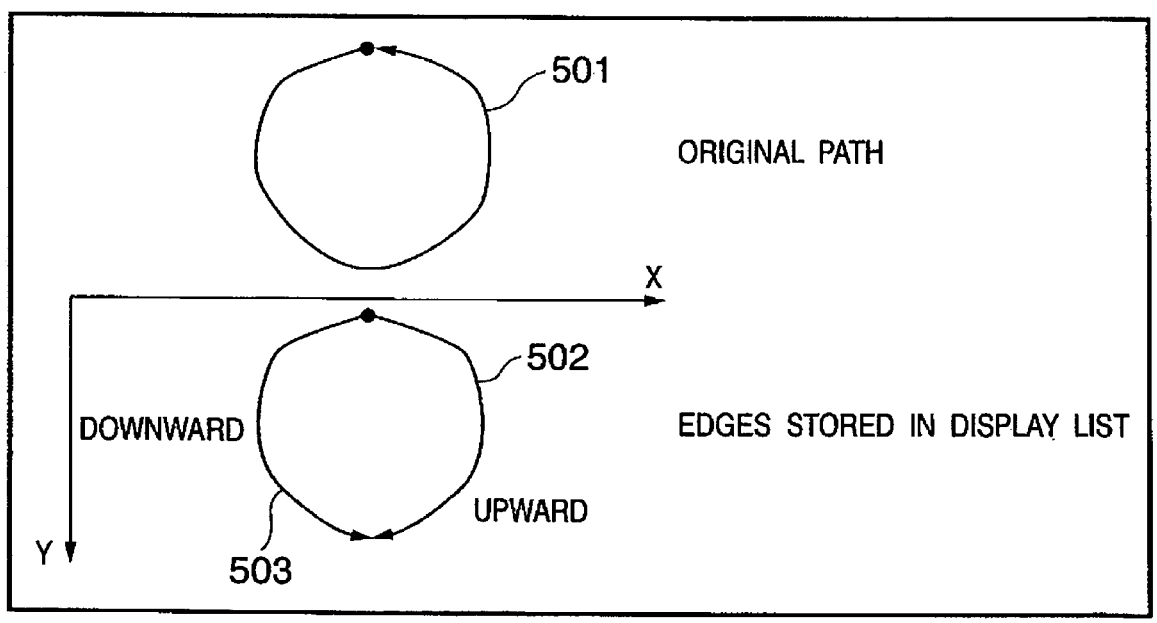
FIG. 5 shows an example of an edge segment division method according to the embodiment of the present invention.

FIG. 5 shows an example of the edge segment division method. If a contour 501 of a drawing instruction is a path in the upper view of FIG. 5, it is divided into 502 and 503 as two edge segments 402, as shown in the lower view of FIG. 5. In this case, when the direction of the contour in the Y direction changes from positive to negative or vice versa, edges are divided, and edge segments 402 are generated for respective division units. Note that the start coordinate of the edge segment 402 assumes a smaller Y-coordinate value, and the edge segment 402 has a direction on X-coordinates. Hence, in case of the edge segments 402 shown in the lower view of FIG. 5, the segment 502 has an upward direction, and the segment 503 has a downward direction.

Figure 6:
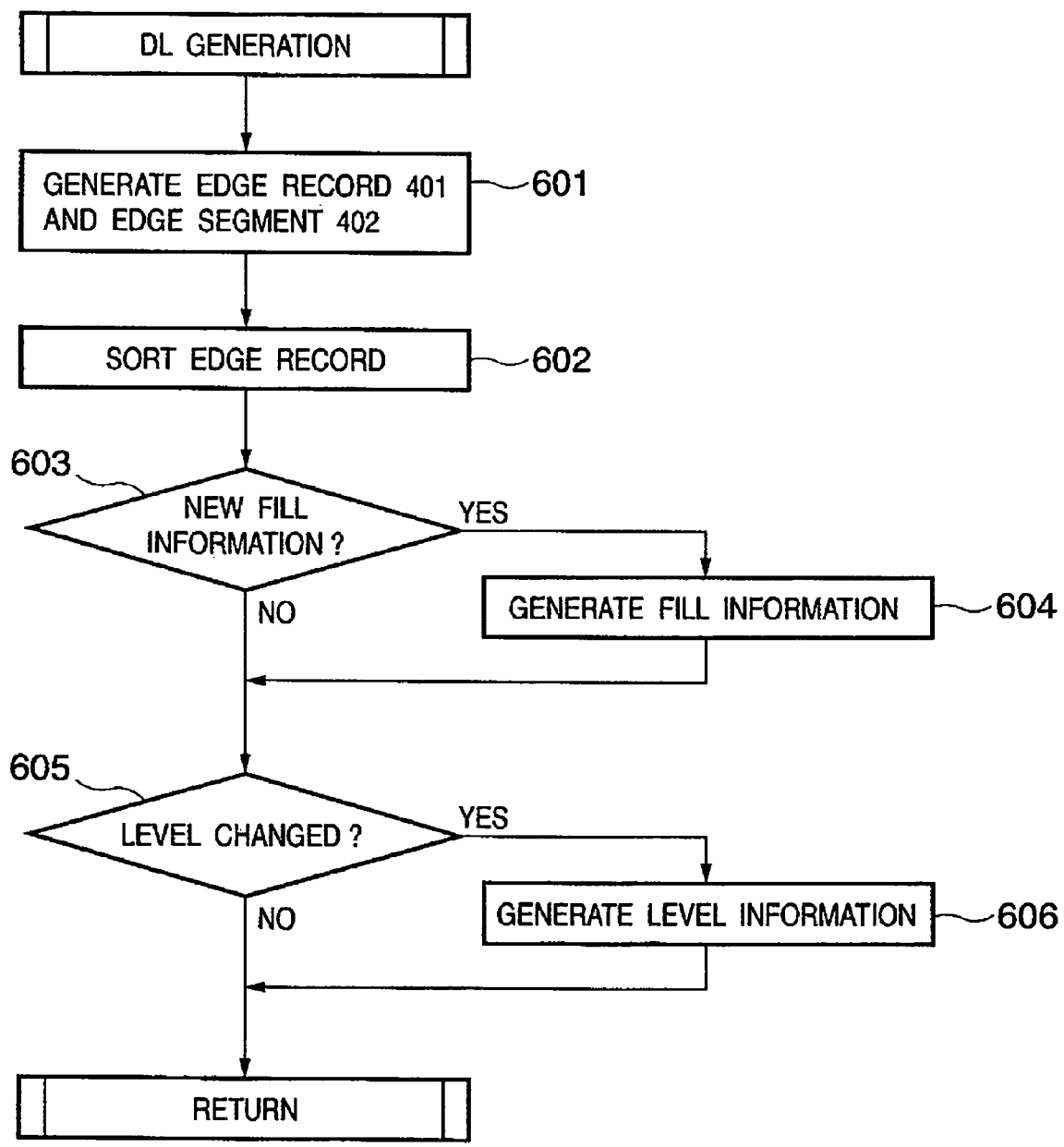
FIG. 6 is a flowchart showing an example of DL generation processing according to the embodiment of the present invention.

FIG. 6 is a flowchart of DL generation in step 303 in FIG. 3. In step 601, an edge is generated from the contour of each graphics object, as shown in FIG. 5, and an edge record 401 and edge segment 402 are generated. In step 602, the edge records 401 are sorted based on the start coordinates of the edge segments 402. It is checked in step 603 if the fill information of the edge is new. If it is determined that the fill information is new and is not registered in the Fill table 405, the flow advances to step 604. On the other hand, if it is determined that the fill information has already been registered in the Fill table 405 and is not new, the flow advances to step 605. In step 604, fill information is generated and is added to the Fill table 405 and its pointer, thus updating the Fill table 405.

It is checked in step 605 if a level is changed. The level is changed when one of the following conditions is met.

(1) ROP is changed.
(2) Fill is changed
(3) A graphic overlaps that with the same level.

As for (3), for example, if a rectangle of level 1 and a triangle of level 1 do not overlap each other, they have level 1. On the other hand, when a rectangle of level 1 overlaps a triangle of level 1, the level of a graphic to be drawn later (e.g., triangle) is changed to 2.

In step 606, level information is generated on the basis of a drawing instruction in the page description data. The level list 403 manages the numbers of the level information, and is added in ascending order of occurrence in turn from 0. The level information includes a drawing logic (ROP) of a graphics object as Op (Operation), a pointer to the Fill table as Fill Index, and a flag indicating whether or not the ROP of the current level refers to a lower layer as Status.

In case of ROP2 of Windows®, a flag indicating whether or not each ROP refers to a lower layer is specified for each ROP as follows. Note that a flag of an ROP that refers to a lower layer is TRUE, and that of an ROP that does not refer to is FALSE.

| BLACK | FALSE |
|---|---|
| NOTMERGEPEN | TRUE |
| MASKNOTPEN | TRUE |
| NOTCOPYPEN | FALSE |
| MASKPENNOT | TRUE |
| NOT | TRUE |
| XORPEN | TRUE |
| NOTMASKPEN | TRUE |
| MASKPEN | TRUE |
| NOTXORPEN | TRUE |
| NOP | TRUE |
| MERGENOTPEN | TRUE |
| COPYPEN | FALSE |
| MERGEPENNOT | TRUE |

-continued

| MARGEPEN | TRUE |
|---|---|
| WHITE | FALSE |

Figure 7:
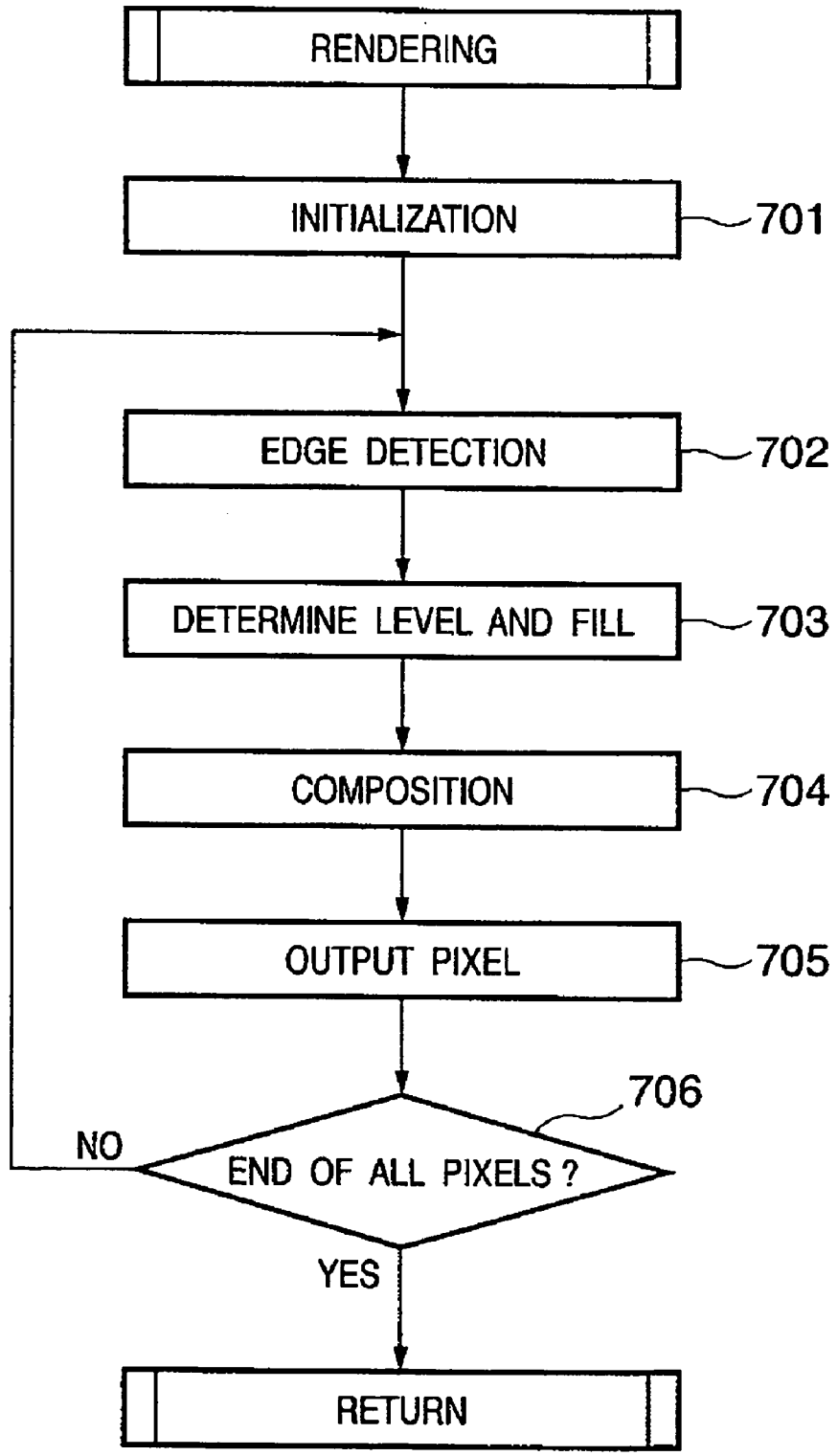
FIG. 7 is a flowchart showing an example of rendering processing according to the embodiment of the present invention.

FIG. 7 is a flowchart of the rendering processing in steps 305 and 308 in FIG. 3. In step 701, an edge sort buffer used in edge generation is initialized. This edge sort buffer is assured in the renderer 210.

In step 702, a pixel is scanned from the upper left corner of a paper sheet to determine to which edge that pixel belongs, thus attaining edge detection. As the scan direction, a scan line is scanned in the X-direction. Upon completion of one scan line, the next scan line is selected, and is scanned in the X-direction.

In step 703, a level to be referred to by an edge and fill information are determined from a link to the display list. In step 704, respective pieces of fill information are composited according to Op (ROP) of the level information. In step 705, composited pixels are output. It is checked in step 706 if all composition processes are complete for respective pixels in a page. If it is determined that all composition processes are complete, the rendering processing ends; otherwise, the flow returns to step 702 to continue processing.

Figure 9:
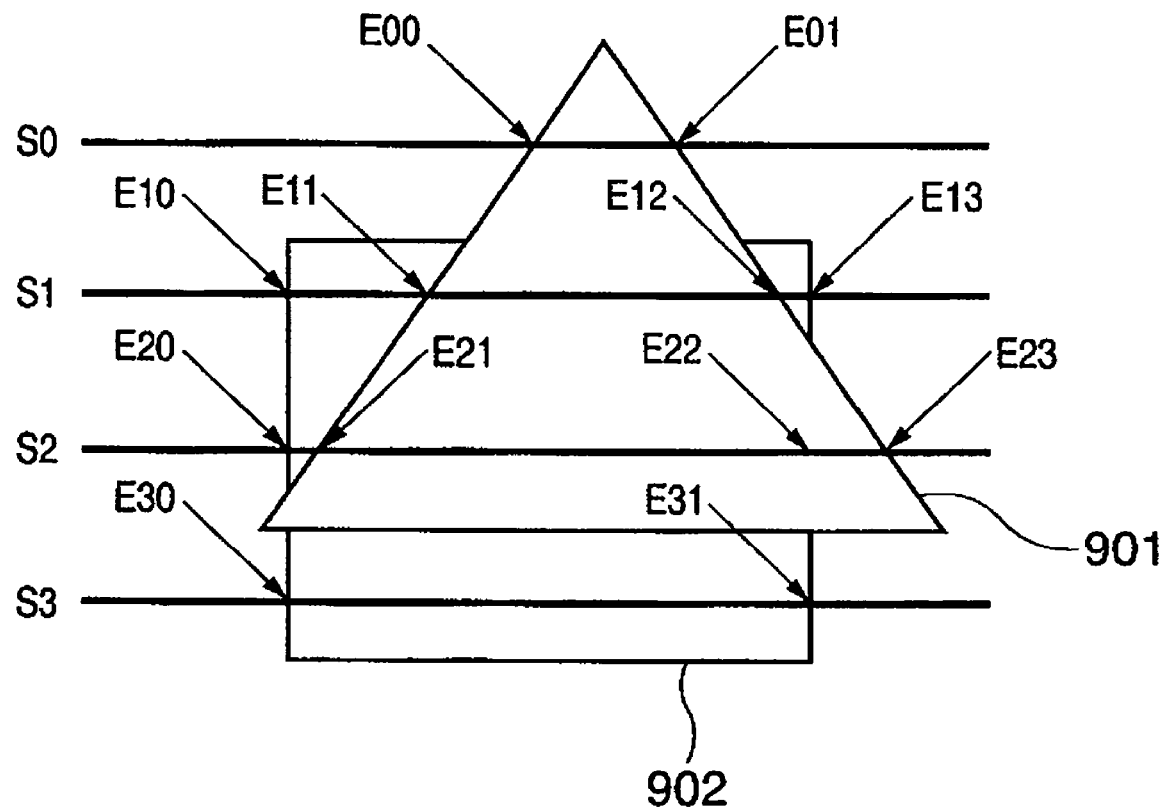
FIG. 9 shows a drawing example according to the embodiment of the present invention.

FIG. 9 shows a drawing example in this embodiment. Initially, a Blue rectangle 902 is drawn by COPYPEN, and a Red triangle 901 is drawn on that rectangle by MARGEPEN. In FIG. 9, reference numerals S0 to S3 denote scan lines; and E00 to E31, intersections between the scan lines and contours of graphics objects.

Figure 10:
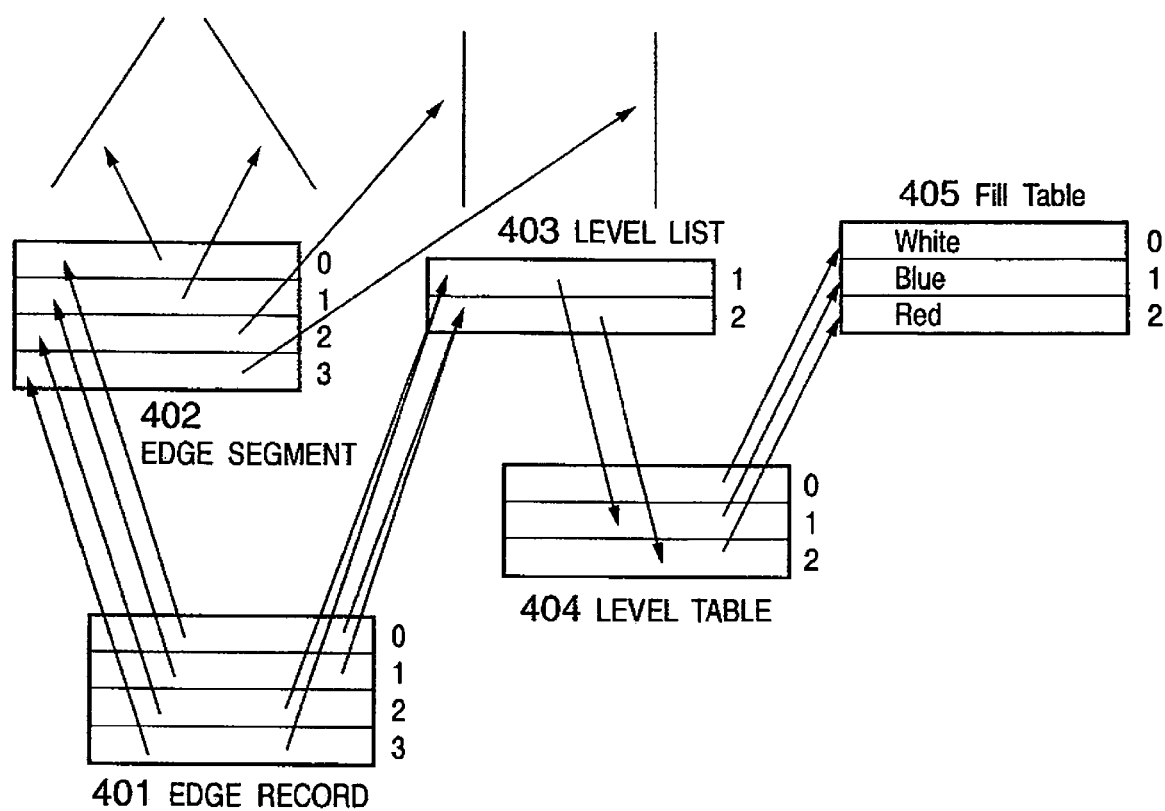
FIG. 10 shows an example of a display list according to the embodiment of the present invention.

FIG. 10 shows a display list of FIG. 9. Edge records 401 store pointers to edge segments 402, and store vector information of a total of four coordinates, i.e., two for the triangle and two for the rectangle, i.e., the start and end coordinate values of respective sides. The edge records 401 are sorted in ascending order of start coordinate, i.e., in the order of the left side of the triangle, the right side of the triangle, the left side of the rectangle, and the right side of the rectangle. The edge segments 402 are linked from the edge records 401, and their contents respectively indicate the left side of the triangle (edge record 1), the right side of the triangle (edge record 2), the left side of the rectangle (edge record 3), and the right side of the rectangle (edge record 4). A level list 403 is linked from the edge records 401, is managed in ascending order of drawing, and stores the rectangle as level=1 and the triangle as level=2.

A level table 404 is linked from the level list 403, and stores, as Op, ROP=COPYPEN in level=0, ROP=COPYPEN in level=1, and ROP=MARGEPEN in level=2. Furthermore, the level table 404 stores, as STATUS, a flag indicating whether or not each ROP refers to a lower level (if an ROP refers to a lower layer, the flag=TRUE; if an ROP does not refer to a lower layer, the flag=FALSE), and FALSE in level=1 and TRUE in level=2. Note that level=0 is a background.

A Fill table 405 is linked from the level table 404: White is linked from level=0, Blue is linked from level=1, and Red is linked from level=2.

Figure 8:
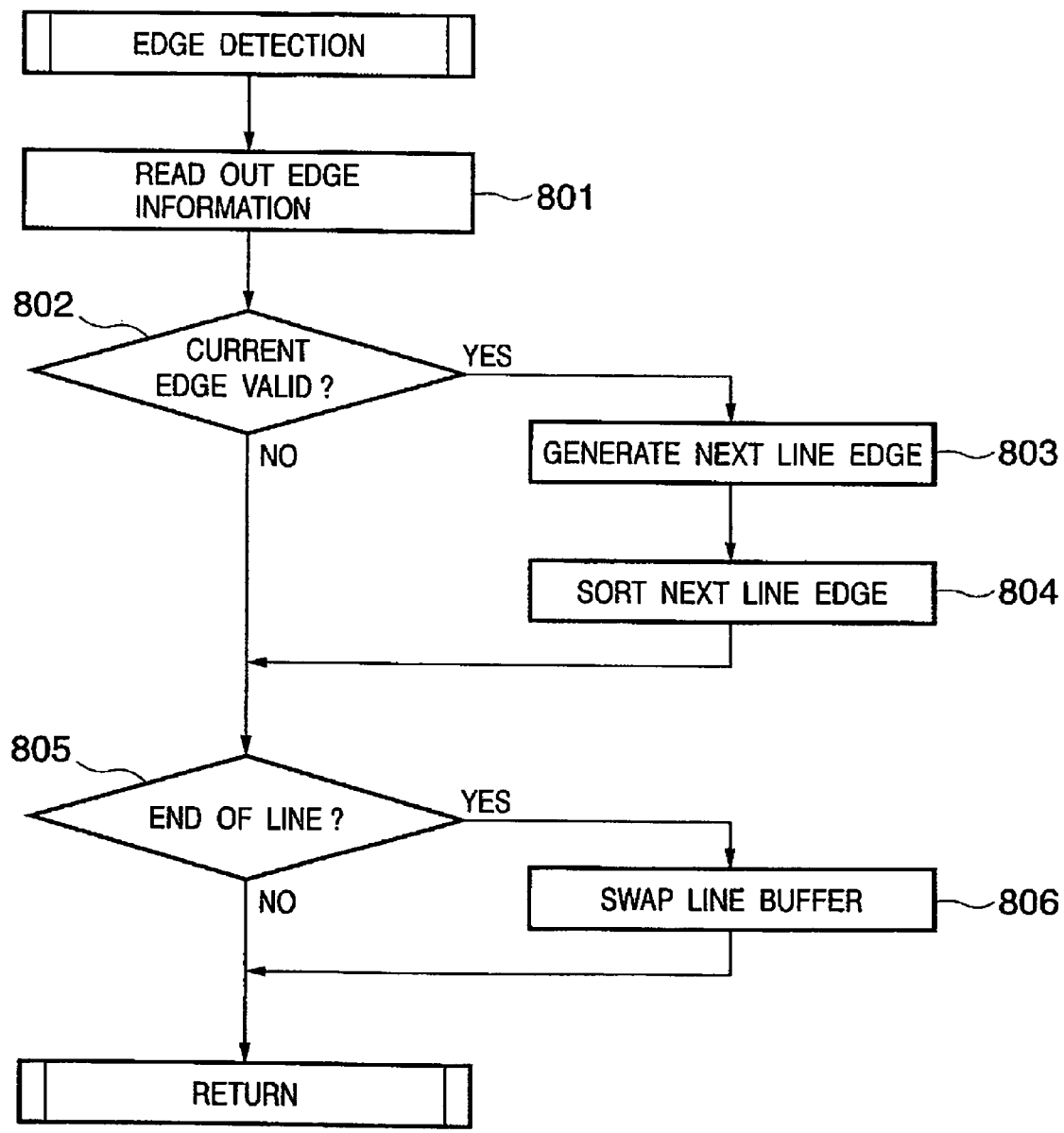
FIG. 8 is a flowchart showing an example of edge detection processing according to the embodiment of the present invention.

FIG. 8 is a flowchart of edge detection in step 702. In step 801, edge information is read out from an edge record 401 and input edge sort buffer. The edge sort buffer includes two, i.e., input and output buffers, and is initialized in step 701. Therefore, immediately after initialization, the input edge sort buffer does not store any edge information, and edge information is read out from only the edge record 401.

It is checked in step 802 if the current pixel position is valid as an edge by comparing the current pixel position with the readout edge information. If it is determined in step 802 that the edge is valid, an edge for the next line is calculated in step 803. On the other hand, if it is determined that the edge is invalid, the flow advances to step 805.

In step 804, the calculated edge for the next line is stored in the output edge sort buffer. In this case, edges are sorted in ascending order of X-coordinate. It is checked in step 805 if the scan line ends. If the scan line ends, the contents of the output edge sort buffer are copied to the input edge sort buffer, and the output edge sort buffer is initialized in step 806.

A description will be given taking the case shown in FIG. 9 as an example. Before the current pixel position reaches E00, "no edge" is output in step 702. In step 703, it is determined that default level=0 is active, and Fill=White is output. In step 704, Fill=White is composited by COPYPEN. In step 705, the result in step 704 is output.

If the current pixel position reaches E00, edge record 1 is read out in step 801. It is determined in step 802 that E00 is valid. In step 803, E11 corresponding to the next scan line value of E00 is generated. In step 804, E11 is stored in the output edge sort buffer.

In step 702, "E00" is output. It is determined in step 703 that level=2 and level=0 are active. In this case, since the lower level reference flag of level=2 is TRUE, level=0 remains active. Fill=White and Fill=Red are output. In step 704, Fill=White and Fill=Red are composited by MARGEPEN. In step 705, the result in step 704 is output.

If the current pixel position reaches E01, edge record 2 is read out in step 801. It is determined in step 802 that E01 is valid. In step 803, E12 corresponding to the next scan line value of E01 is generated. In step 804, E12 is stored in the output edge sort buffer. Since values are sorted in ascending order, the edge sort buffer stores the values in the order of E11 and E12. In step 702, "E01" is output. In step 703, it is determined that level=0 is active. Fill=White is output. In step 704, Fill=White is composited by COPYPEN. In step 705, the result in step 704 is output.

If the current pixel position reaches the terminal end of scan line S0, the contents of the output edge sort buffer are copied to the input edge sort buffer, and the output edge sort buffer is initialized in step 806.

If the current pixel position reaches E10, edge record 3 is read out in step 801. In step 802, E10 and E11 are compared, and it is determined that E10 is valid. In step 803, E20 corresponding to the next scan line value of E10 is generated. In step 804, E20 is stored in the output edge sort buffer. In step 702, "E10" is output. In step 703, it is determined that level=1 is active. Since level 1 does not refer to a lower level, level=0 is inactivated. Fill=Blue is output. In step 704, Fill=Blue is composited by COPYPEN. In step 705, the result in step 704 is output.

If the current pixel position reaches E11, E11 is read out from the input edge sort buffer in step 801. It is determined in step 802 that E11 is valid. In step 803, E21 corresponding to the next scan line value of E11 is generated. In step 804, E21 is stored in the output edge sort buffer. The buffer stores values in the order of E20 and E21. In step 702, "E11" is output. In step 703, it is determined that level=1 and level=2 are active. Fill=Blue and Fill=Red are output. In step 704, Fill=Blue and Fill=Red are composited by MARGEPEN. In step 705, the result in step 704 is output.

By repeating the above processing, a page can be rendered. Note that level=0 is White. However, if it is determined in step 305 that the display list memory is full of data, all display list data until they are generated are rendered to form a bitmap image for the paper size (for one page in case of an A4-size sheet). At this time, a portion corresponding to a non-generated display list is filled with White corresponding to level 0. In this manner, the already generated display list data and non-generated display list data are combined to generate a bitmap image for one paper sheet. Then, Fill Table=0 stores a pointer to this bitmap image.

Figure 11:
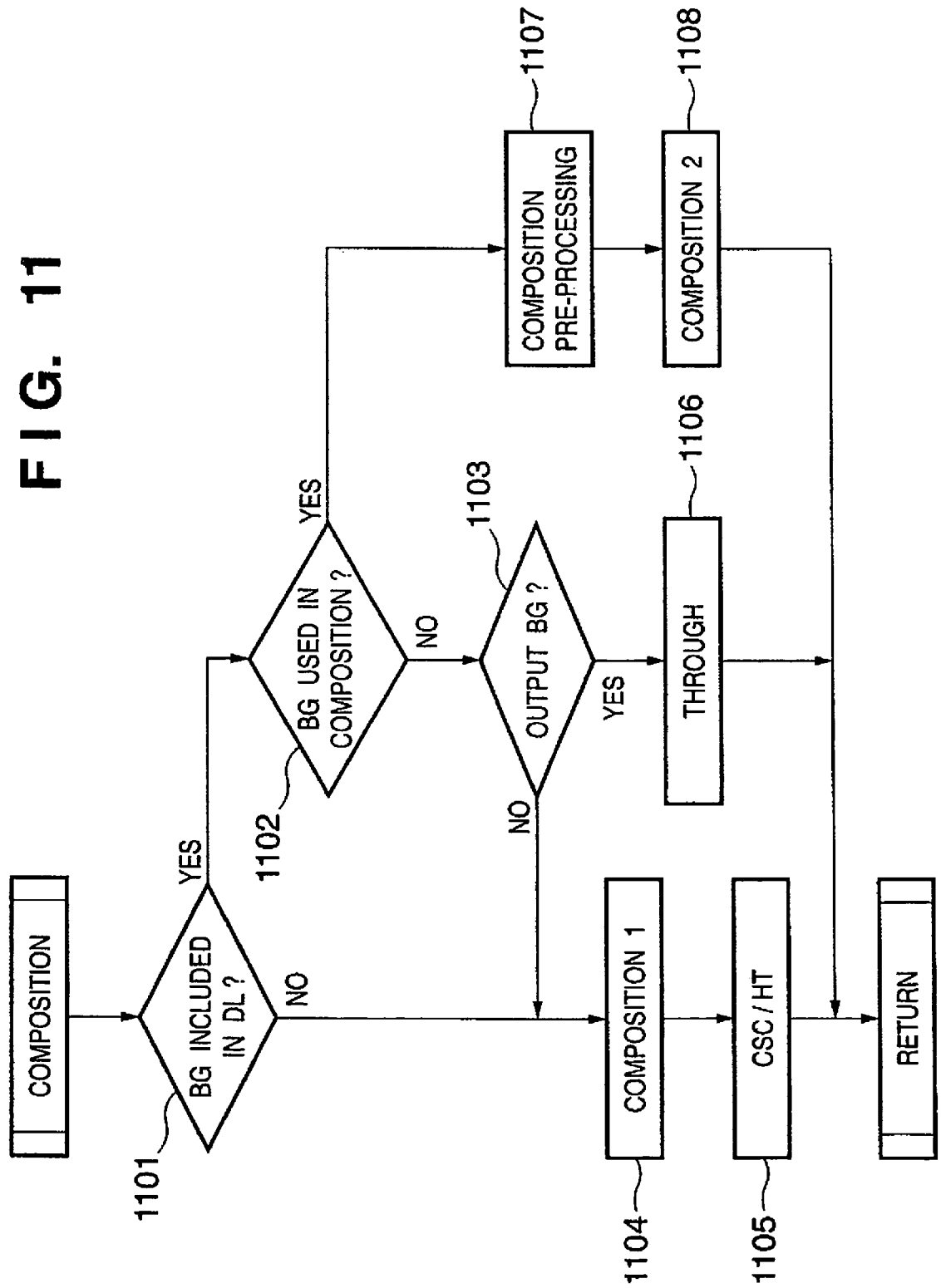
FIG. 11 is a flowchart showing an example of composition processing according to the embodiment of the present invention.

FIG. 11 is a flowchart showing the composition processing in step 704. It is checked in step 1101 if the display list (DL) includes a background (BG) bitmap image generated when the display list memory is full of data. This checking step can be attained by seeing if Fill Table=0 stores a pointer to the background bitmap image. If it is determined that the display list includes such bitmap image, the flow advances to step 1102; otherwise, the flow advances to step 1104.

It is checked in step 1102 if composition is made using the background bitmap image generated when the display list memory is full of data upon composition. This checking step is made based on the contents of ROP. As for an ROP (e.g., MARGEPEN) with a lower-level reference flag=TRUE, it is determined that composition is made using the background bitmap image. On the other hand, as for an ROP (e.g., COPYPEN) with a lower-level reference flag=FALSE, it is determined that composition using the background bitmap image is not made. If it is determined that composition is made using the background, the flow advances to step 1107; otherwise, the flow advances to step 1103.

It is checked in step 1103 if composition is made by COPYPEN using the background bitmap image generated when the display list memory is full of data. This checking step can be attained by seeing if the corresponding portion in the image is a background portion that uses the background bitmap image intact. That is, if the corresponding portion in the image is a background portion where no new object need be composited, the background bitmap image is used intact. If it is determined that such composition is made, the flow advances to step 1106. If it is determined that such composition is not made (i.e., the background bitmap image is not used in any case), the flow advances to step 1104. In step 1104, composition processing (first composition processing) based on ROP processing for corresponding R, G, and B multilevel data stored in the Fill table 405 is executed. This composition processing is executed using only fill information which influences a final output pixel. In this manner, the composition processing in step 1104 is executed using multilevel data. In step 1105, color conversion processing and halftoning processing are executed. That is, the R, G, and B data after composition are converted into C, M, Y, and K multilevel data, and the C, M, Y, and K multilevel data then undergo halftoning processing to be converted into C, M, Y, and K 1-bit binary data.

In step 1106, through processing is executed. That is, the background bitmap image generated when the display list memory is full of data is output intact. Note that the bitmap image is C, M, Y, and K 1-bit binary data which have already undergone the halftoning processing.

In step 1107, composition pre-processing is executed. In this processing, fill information of multilevel data to be composited from the input buffer is converted from R, G, and B multilevel data into C, M, Y, and K multilevel data, and the C, M, Y, and K multilevel data undergo halftoning processing to be converted into C, M, Y, and K 1-bit binary data. Then, OR processing of respective planes is further executed as follows. The reason why such processing is made is that since C, M, and Y colors and K are not independent from each other in C, M, Y, and K data, if the ROP processing of objects of C, M, Y, and K data is executed, the same result as that obtained using R, G, and B data cannot be obtained. Hence, the ROP processing must be done after C, M, Y, and K data are into C, M, and Y data. More specifically, in step 1107 the composition pre-processing is executed as follows. That is, R, G, and B multilevel data from the intermediate buffer are color-converted into C, M, Y, and K multilevel data, and the color-converted C, M, Y, and K multilevel data undergo halftoning processing to obtain C, M, Y, and K binary data (1 bit/color). The C, M, Y, and K binary data that have undergone the halftoning processing are converted into C, M, and Y binary data (1 bit/color). Also, the compressed background bitmap data generated in step 306 is expanded, and the expanded C, M, Y, and K binary data are converted into C, M, and Y binary data.

$$C'=C|K$$

$$M'=M|K$$

$$Y'=Y|K$$

In this manner, C', M', and Y' are given as the ORed results of C, M, and Y, and K, an C, M, Y, and K halftone data are converted into C, M, and Y halftone data. In step 1108, second composition processing is executed. That is, the composition processing based on ROP processing is executed for C, M, and Y 1-bit data which are obtained by color-converting R, G, and B multilevel data input from the intermediate buffer into C, M, Y, and K multilevel data, and converting the color-converted C, M, Y, and K multilevel data by halftoning processing in step 1107, and C, M, and Y binary data (1 bit/color) which are obtained by expanding the background bitmap data generated in step 306 and converting the expanded C, M, Y, and K binary data. Furthermore, the composited data undergo UCR processing as follows to convert the C, M, and Y data into C, M, Y, and K data again.

Note that a conversion formula which has (C', M' Y') as C, M, and Y data after the composition processing and (C", M", Y", K") as C, M, Y, and K data after conversion is given by:

$$K''=C'\ \&\ M'\ \&\ Y';$$

if (K"=1){C"=M"=Y"=0} else {C"=C'; M"=M'; Y"=Y';}

That is, if all of C', M', and Y' are 1, K" is 1; otherwise, K" is 0. Furthermore, if K" is 1, C", M", and Y" are 0; otherwise, C", M", and Y" remain unchanged.

With the above arrangement, when raster data are generated from a display list and a display list using the generated raster page as a background is generated in case of an insufficient memory that stores a display list, since the background can be stored as binary data, memory savings can be attained.

Furthermore, since a first composition unit which performs composition using R, G, and B multilevel data and a second composition unit which performs composition processing using C, M, and Y 1-bit data that have undergone halftoning processing are selectively used upon composition, raster data with high-image quality can be generated.

Second Embodiment

In the first embodiment, the number of gray levels after the halftoning processing is expressed by 1 bit/color. However, the number of bits is not limited to 1. Hence, an example of the second composition unit when the number of bits is 2 or 4 will be described below.

In step 1107, composition pre-processing is executed, and C, M, and Y data are calculated from C, M, Y, and K data for the background bitmap image by:

$$C'=\text{if}((C+K)>\text{MAXVALUE})\ \text{MAXVALUE};\ \text{else}\ C+K;$$

$$M'=\text{if}((M+K)>\text{MAXVALUE})\ \text{MAXVALUE};\ \text{else}\ M+K;$$

$$Y'=\text{if}((Y+K)>\text{MAXVALUE})\ \text{MAXVALUE};\ \text{else}\ Y+K;$$

Note that a value such as 1 or the like is given to MAXVALUE in case of 1 bit/color. In case of 2 bits/color, "4" is given to MAXVALUE. Also, in case of 4 bits/color, "16" is given to MAXVALUE.

Fill information of multilevel data to be composited is converted from R, G, and B multilevel data into C, M, Y, and K multilevel data, and the C, M, Y, and K multilevel data undergo halftoning processing to be converted into C, M, Y, and K 1-bit binary data. Furthermore, C, M, and Y data are calculated from C, M, Y, and K data by:

$$C'=\text{if}((C+K)>\text{MAXVALUE})\ \text{MAXVALUE};\ \text{else}\ C+K;$$

$$M'=\text{if}((M+K)>\text{MAXVALUE})\ \text{MAXVALUE};\ \text{else}\ M+K;$$

$$Y'=\text{if}((Y+K)>\text{MAXVALUE})\ \text{MAXVALUE};\ \text{else}\ Y+K;$$

In step 1108, the second composition processing is executed. That is, composition processing such as ROP processing or the like is executed for C, M, and Y 2- or 4-bit data that have undergone the halftoning processing. Furthermore, UCR processing is executed as follows.

Note that a conversion formula which has (C', M', Y') as C, M, and Y data after the composition processing and (C", M", Y", K") as C, M, Y, and K data after conversion is given by:

$$K''=\min(C', M', Y')$$

$$C''=C'-K'';\ M''=M'-K'';\ Y''=Y'-K'';$$

That is, K" is the minimum value of C', M', and Y', and C", M", and Y" are the differences between C', M', and Y' and K".

With the above arrangement, when raster data are generated from a display list and a display list using the generated raster page as a background is generated in case of an insufficient memory that stores a display list, since the background can be stored as binary data, memory savings can be attained. Furthermore, since the first and second composition units are selectively used upon composition, raster data with high-image quality can be generated.

As described above, according to the embodiments of the present invention, when the memory of the intermediate buffer becomes insufficient, an image after halftoning processing is compressed and held. Hence, the memory size of the intermediate buffer can be reduced, and print processing can be executed in case of an insufficient memory although the quality drops. On the other hand, when the memory of the intermediate buffer is sufficient, and processing can be normally done, since color conversion and halftoning processing are executed after composition, high-quality processing can be assured.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-326461 filed on Nov. 10, 2004, which is hereby incorporated by reference herein.

What is claimed is:

1. A data processing apparatus comprising:
a first processing unit for executing composition processing based on ROP processing of data which have gone through color conversion processing for converting RGB multilevel data to CMYK multilevel data, halftoning processing for converting CMYK multilevel data to CMYK binary data and conversion processing for converting CMYK binary data to CMY binary data;
a second processing unit for executing composition processing for RGB multilevel data, color conversion processing for converting the composite RGB multilevel data to CMYK multilevel data and halftoning processing for converting CMYK multilevel data to CMYK binary data; and
a selector for selecting one of said first and second processing units by selecting said first processing unit when it is determined that a display list includes compressed background bitmap data generated during a period where a memory is insufficient and the composition processing is to be executed using background bitmap data, and by selecting said second processing unit when the display list does not include the compressed background bitmap data and for not selecting any of said first and second processing units when it is determined that the display list includes the compressed background bitmap data, but the composition processing is not to be executed using the background bitmap data.

2. The apparatus according to claim 1, wherein said selector selects one of said first and second processing units for each pixel.

3. The apparatus according to claim 1, further comprising a print unit for performing print processing on the basis of data processed by one of said first and second processing units.

4. The apparatus according to claim 1, wherein it is determined that the composition processing using the background bitmap is to be executed for such ROP processing that has a flag indicating whether or not the ROP processing refers to a lower layer set to TRUE and it is determined that the composition processing is not be executed for such ROP processing that has the flag set to FALSE.

5. A data processing method comprising:
a first processing step, carried out by a data processing apparatus, of executing composition processing based on ROP processing of data which have gone through color conversion processing for converting RGB multilevel data to CMYK multilevel data, halftoning processing for converting CMYK multilevel data to CMYK binary data and conversion processing for converting CMYK binary data to CMY binary data;
a second processing step, carried out by the data processing apparatus, of executing composition processing for RGB multilevel data, color conversion processing for converting the composite RGB multilevel data to CMYK multilevel data and halftoning processing for converting CMYK multilevel data to CMYK binary data; and
a selection step, carried out by the data processing apparatus, of selecting one of the first and second processing steps by selecting said first processing step when it is determined that a display list includes compressed background bitmap data generated during a period where a memory is insufficient and the composition processing is to be executed using background bitmap data, and by selecting said second processing step when the display list does not include the compressed background bitmap data and for not selecting any of said first and second processing units when it is determined that the display list includes the compressed background bitmap data, but the composition processing is not to be executed using the background bitmap data.

6. The method according to claim 5, wherein the selection step includes a step of selecting one of the first and second processing steps for each pixel.

7. The method according to claim 5, further comprising a print step of performing print processing on the basis of data processed in one of the first and second processing steps.

8. A computer-readable storage medium storing a computer program causing a computer to execute a data processing method comprising:
a first processing step of executing composition processing based on ROP processing of data which have gone through color conversion processing for converting RGB multilevel data to CMYK multilevel data, halftoning processing for converting CMYK multilevel data to CMYK binary data and conversion processing for converting CMYK binary data to CMY binary data;
a second processing step of executing composition processing for RGB multilevel data, color conversion processing for converting RGB multilevel data to CMYK multilevel data and halftoning processing for converting CMYK multilevel data to CMYK binary data; and
a selection step of selecting one of the first and second processing steps by selecting said first processing step when it is determined that a display list includes compressed background bitmap data generated during a period where a memory is insufficient and the composition processing is to be executed using background bitmap data, and by selecting said second processing step when the display list does not include the compressed background bitmap data and for not selecting any of said first and second processing units when it is determined that the display list includes the compressed background bitmap data, but the composition processing is not to be executed using the background bitmap data.

* * * * *